United States Patent [19]
Höfer et al.

[11] Patent Number: 5,114,628
[45] Date of Patent: May 19, 1992

[54] METHOD FOR THE MANUFACTURE OF CONTACT LENSES

[75] Inventors: Peter Höfer, Aschaffenburg; Peter Hagmann, Hösbach-Bahnhof; Gunther Krieg, Karlsruhe; Eberhard Vaas, Pforzheim, all of Fed. Rep. of Germany

[73] Assignee: Ciba-Geigy Corporation, Ardsley, N.Y.

[21] Appl. No.: 644,355

[22] Filed: Jan. 23, 1991

[30] Foreign Application Priority Data

Jan. 24, 1990 [DE] Fed. Rep. of Germany ....... 4002029

[51] Int. Cl.⁵ .............................................. B29D 11/00
[52] U.S. Cl. .................................... 264/1.4; 51/284 R; 156/626; 156/643; 264/1.1; 264/2.5; 264/40.1
[58] Field of Search ................ 264/1.1, 2.5, 40.1, 264/1.4; 156/58, 59, 626, 643; 51/104 LG, 284 R

[56] References Cited

U.S. PATENT DOCUMENTS

| | | | |
|---|---|---|---|
| 2,253,497 | 8/1941 | Kollmorgen | 264/2.5 |
| 2,264,080 | 11/1941 | Hunter | 264/2.5 |
| 2,664,025 | 12/1953 | Herman | 264/2.5 |
| 4,497,144 | 2/1985 | Kobayashi et al. | 264/2.5 |
| 4,842,782 | 6/1989 | Portney et al. | 264/1.4 |
| 4,912,880 | 4/1990 | Haddock et al. | 51/101 LG |
| 4,980,993 | 1/1991 | Vmezaki | 51/165.71 |
| 4,989,316 | 2/1991 | Logan et al. | 51/101 LG |

FOREIGN PATENT DOCUMENTS

0359084 3/1990 European Pat. Off. .
2513777 10/1978 Fed. Rep. of Germany .
3521745 12/1985 Fed. Rep. of Germany .

OTHER PUBLICATIONS

Kivajew, A. A.; Fotokeratometrie in der Anpassungspraxis Harter Kontaktlinsen aka Augenoptik-Berlin 100 (1983) 4, Sten. 108–109, dated May 12, 1990 (DE).

*Primary Examiner*—James Lowe
*Attorney, Agent, or Firm*—Harry Falber; William G. Hervey

[57] ABSTRACT

A method for the manufacture of contact lenses, especially individually fitted contact lenses, and a contact lens production system therefor is described, wherein the topography of the surface of the eye is measured three-dimensionally, the geometry of the rear face of the lens is determined so as to fit the topography measured, the optical effect of a lachrymal lens which is formed between the rear face of the lens and the surface of the eye is determined, the geometry of the front face of the lens is determined taking into account the optical effect of the lachrymal lens and the sight correction to be achieved, and the data so obtained for the lens geometry of the front and rear faces of the lens are stored and transferred to a control arrangement for the manufacture of the lens in a machine tool.

10 Claims, 2 Drawing Sheets

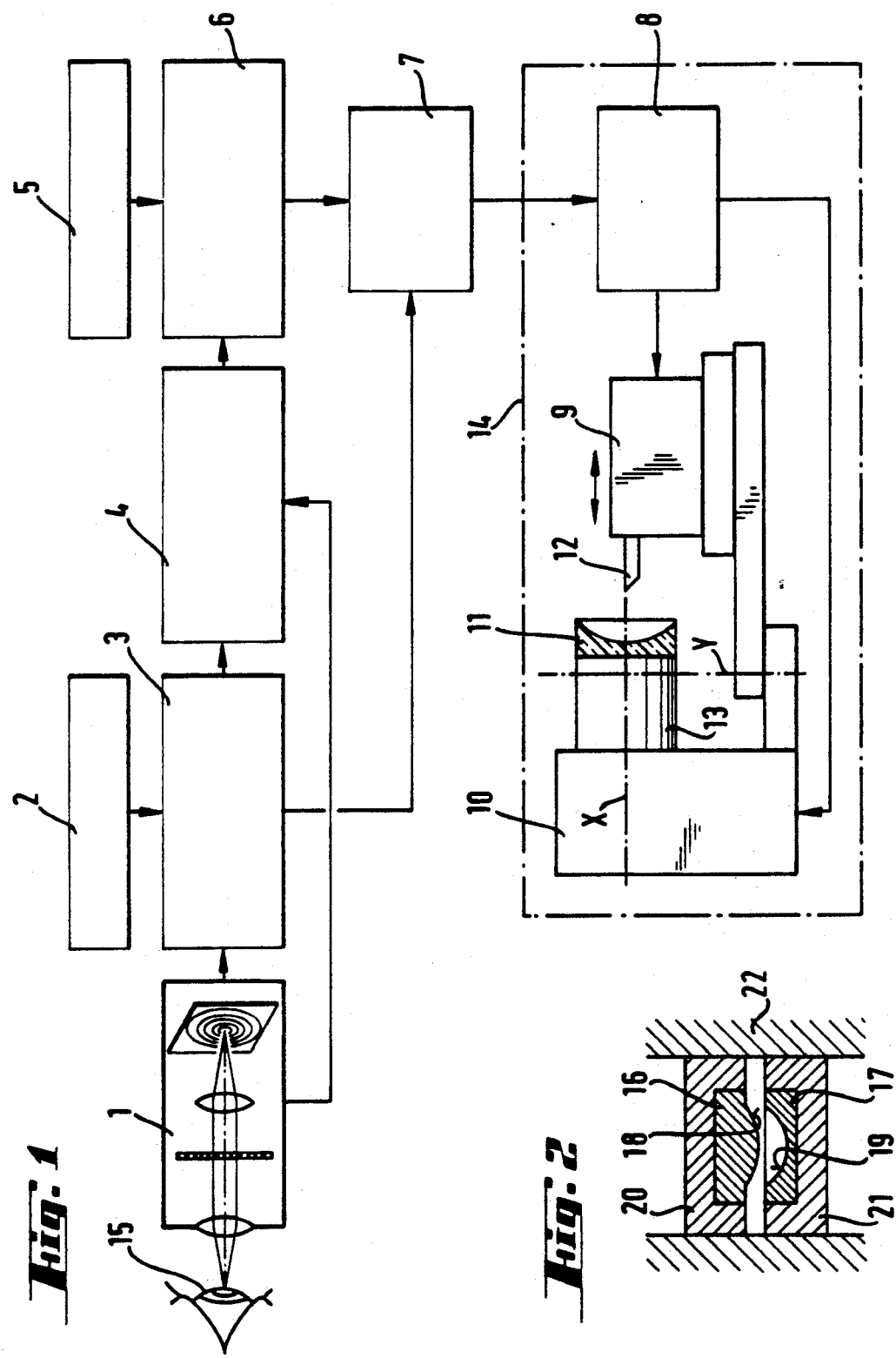

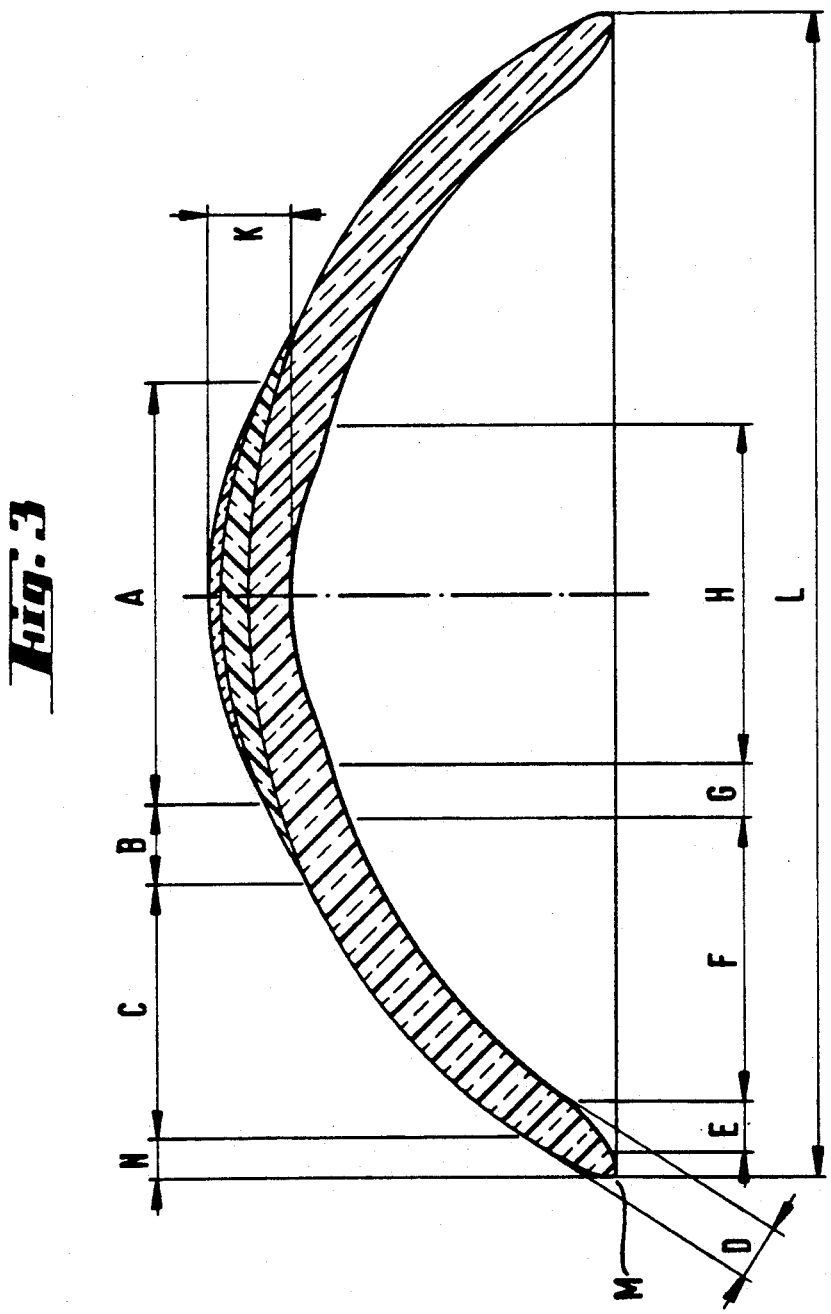

METHOD FOR THE MANUFACTURE OF CONTACT LENSES

BACKGROUND OF THE INVENTION

The invention relates to a method for the manufacture of contact lenses, especially individually fitted contact lenses, and to a contact lens production system therefor.

A not inconsiderable number of people having sight defects cannot be provided with conventional commercially available contact lenses since, owing to the topography of the surface of the eye, especially in the region of the cornea, conventional lenses, which are to some extent standardised, cannot be tolerated or result in only unsatisfactory sight correction. The only solution remaining for such persons is the production of special lenses, which entails considerably more time and expense and also an increased fitting risk. Accurate fitting can generally be achieved only after several attempts. In not a few cases, re-working of the lens or even a change of lens type is necessary.

The problem of the invention is to provide a method and a contact lens production system by means of which an economical production of individually fitted contact lenses, especially the production of special lenses, is achieved. Production methods are to be used such as are normally employed for the large-scale production of contact lenses.

SUMMARY OF THE INVENTION

That problem is solved according to the invention, as regards the method, in that the topography of the surface of the eye is measured three-dimensionally;

the geometry of the rear face of the lens is determined on the basis of a fitting characteristic or fitting philosophy (fitting criteria, such as, for example, steep, flat fit etc.) so as to fit the measured topography;

the optical effect of a lachrymal lens which is formed between the thus determined rear face of the lens and the surface of the eye and which is limited by the determined geometry of the rear face and the measured topography of the surface of the eye, is determined, taking into account the mechanical properties of the contact lens (hard, hard/flexible, flexible, soft);

the geometry of the front face of the lens is determined taking into account the optical effect of the lachrymal lens and the sight correction to be achieved by the contact lens and also taking particular account of the contact lens material used;

the data for the lens geometries of the front face and the rear face of the lens are stored; and the particular lens concerned is produced in accordance with the stored lens geometry data.

The production of the lenses is effected in accordance with one of the known methods. Examples are the lathe technique the one-surface casting process (semi-mould)

the casting process (full mould)

laser machining and thermoforming processes.

The classical method of manufacturing contact lenses is the lathe technique. A material-removing tool is used which removes material from a lens blank, which may be a lens button or half-button. The material-removing tool is controlled by the stored geometry data by means of an appropriate control arrangement in the machine tool.

A cutting tool, for example a diamond, can be used as the material-removing tool. The lens blank is secured to a headstock centre which is rotated about the headstock axis together with the headstock. In accordance with the stored geometry values, the material-removing tool, especially the cutting tool, is then moved under the control of the stored geometry data so that the desired geometries are produced on the front face or the rear face of the contact lens as well as at the edge. A laser beam controlled in accordance with the stored geometry data of the lens is also suitable as the material-removing tool.

Lenses can also be manufactured by the one-surface casting method or the casting method. In the casting method, it is possible to use, in known manner, two mould halves between which the contact lens material is introduced in a starting state. The contact lens material is then converted, for example by polymerisation, into its final state, the geometry of the front face and the geometry of the rear face of the lens being formed by the moulding faces on the two mould halves. The moulding faces of the moulding halves of the mould have been shaped beforehand in accordance with the stored geometry data for the front face and the rear face of the lens. That can be effected by an appropriately controlled material-removing tool which removes material from the mould in the region of the moulding faces to be produced. That can be effected in the same manner as in direct lens manufacture by removing material from a mould blank.

The desired surface geometry of the contact lens is manufactured by the moulding faces on the mould or the mould halves.

Moulds are also known in the case of which a final edge shaping is carried out on the lens body during the casting process.

After completion of the casting operation, subsequent machining of the edge can be carried out if necessary. The direct manufacture of the mould by removing material from a mould blank is preferred for a single-piece production of lenses or where the starting materials for the contact lenses are extremely expensive. For mass production or for the manufacture of contact lenses in large numbers by the casting process, first shaping tools are formed in accordance with the stored geometry values for the front face and the rear face as well as for the edge of the lens. The moulds are then manufactured using those shaping tools, for example in accordance with the injection moulding process.

The invention can be used in the manufacture of hard, soft or flexible lenses. The invention is especially advantageous in the manufacture of special lenses for obtaining an individual fit, which cannot be achieved using standardised types of contact lens. The invention is also distinguished by a high degree of reproducibility of the lens geometry to be shaped. It is not any more necessary to try out so-called "borrowed" lenses. In addition, in the case of the invention the physiology of the eye of the contact lens wearer is taken into account in an optimum manner. By means of the invention, an accurate integration into the sight correction of the optical effects of the lachrymal fluid lens between the rear face of the lens and the surface of the eye is achieved. Furthermore, a high degree of tolerability and a rapid provision of contact lenses is achieved even where the cornea is severely deformed in the case of keratoconus, traumatic changes, etc.

The invention is explained in detail with reference to the figures and by means of embodiments.

BRIEF DESCRIPTION OF THE FIGURES

FIG. 1 shows an embodiment of a contact lens production system according to the invention; and FIG. 2 shows an embodiment of a shaping arrangement for lens manufacture, which can be used as an alternative in the embodiment shown in FIG. 1; and FIG. 3 shows a contact lens profile.

DESCRIPTION OF THE PREFERRED EMBODIMENTS

The contact lens production system shown in FIG. 1 comprises a topography measuring arrangement 1 for the three-dimensional measurement of the topography of the surface of a human eye 15. That topography measuring arrangement 1 can operate, for example, in accordance with the Moire-technique. In that method, a line grid is projected onto the surface to be measured, that is to say, onto the surface of the eye, which grid, when the eye is viewed through it, produces interference lines which represent contour lines of the surface of the eye. That so-called Moire-image contains the complete information necessary for ascertaining the surface coordinates. It is, so to speak, a contour image of the surface of the eye.

In addition, the topography measuring arrangement 1 may also be a commercially available topography measuring apparatus, for example an "ECT 100 Corneal topographer" manufactured by Optimed Inc., Alpharetta. In this case too, similarly to the case of the Moire-image, an image of the eye surfaces is obtained in contour lines. In addition, in order to scan the surface of the eye without touching it, a so-called laser stylus can be used in the case of which a focus detector analyses the light scattered back from the scanned surface and supplies corresponding profile signals for the various surface profiles.

In a downstream computer unit 3, the geometry of the rear face of the contact lens to be manufactured is determined from the surface signals supplied by the topography measuring arrangement 1. In addition, a fitting characteristic or a fitting philosophy is supplied by an adjusting arrangement 2 which may also be in the form of a storage arrangement. The adjusting arrangement 2 indicates to the computer unit 3 whether the fitting of the rear face of the lens to the surface of the eye is to be, for example, flat or steep. That is to say, the geometry of the rear face of the contact lens to be manufactured is determined in the computer unit 3 on the basis of the topographical data of the surface of the eye, especially in the region of the cornea, and on the basis of a selected fitting philosophy. The rear face normally includes the rear optical zone, the rear transition zone, the fitting zone, the rear bevel and also the edge that forms the transition region between the front and rear faces of the contact lens (FIG. 3).

In another computer unit 4, connected to the computer unit 3, the optical effect of the lachrymal lens, which is formed between the surface of the eye and the rear face of the contact lens when the contact lens is worn, is determined, taking into account the topography measurement data ascertained by the topography measuring arrangement 1 and the rear face geometry data determined in the computer unit 3, as well as the mechanical properties of the contact lens material. For that purpose, the computer unit 4 is connected both to the topography measuring arrangement 1 and to the computer unit 3. The optical effect of the lachrymal lens can therefore be determined taking into account the refractive index of the lachrymal fluid.

Connected to the computer unit 4 is a third computer unit 6 in which the geometry of the front face of the contact lens is determined. The geometry of the front face is determined taking into account the optical effect of the lachrymal lens, determined in the computer unit 4. The desired sight correction to be achieved by the contact lens is also taken into account. These data for sight correction are stored in a storage arrangement 5. That arrangement may, however, also be an appropriate input arrangement in the case of which the appropriate sight correction values (vertex refraction values) are fed in, for example using a keyboard. In the computer unit 6, the entire correction system, composed of the contact lens (refractive index of the lens material) and the lachrymal lens, is taken into account. That is to say, the optical effect of the lachrymal lens and the geometry of the rear face, predetermined by the computer unit 3, of the contact lens to be manufactured are taken into account in determining the geometry of the front face of the contact lens. The front face of the contact lens includes the front optical zone, the front transition zone, the lenti and the front bevel.

FIG. 3 shows the various zones on the front and rear faces of the contact lens. The terms used therefor are shown in the following Table.

TABLE

| Zone | Zone name |
| --- | --- |
| A | front optical zone |
| B | front transition zone |
| C | lenti |
| D | edge thickness |
| E | rear bevel |
| F | fitting zone |
| G | rear transition zone |
| H | rear optical zone |
| K | centre thickness |
| L | diameter |
| M | edge |
| N | front bevel |

An optimum seating of the contact lens, coupled with excellent tolerability, can be achieved when the rear face rests as evenly as possible on the cornea, possibly also on a portion of the sclera. A situation must be reached where the contact lens offers the upper lid very little resistance.

The basic physiological requirements, however, stand in the way of that aim to some extent. The supply of oxygen to the cornea is effected from outside by permeation through the contact lens and by means of the oxygen incorporated in the lachrymal fluid. Taking into account the two main requirements, viz. optimum tolerability and maximum supply of oxygen to the cornea, a geometry is determined which, on the one hand, permits excellent spontaneous comfort and, on the other, owing to a specifically determined amount of lachrymal fluid, which is constantly being replaced, between the contact lens and the cornea, guarantees a good supply of oxygen.

To that end, the following principal parameters are determined by means of the computer units:
overall diameter of the lens internal geometry (ellipsoid, sphere, combination etc.)

volume of the lachrymal fluid lens amount of lachrymal fluid replaced optimised overall design of the contact lens, with particular account being taken of a tolerable lenticular edge total vertex refractive value of the contact lens taking into account the lachrymal fluid lens When determining the principal parameters, particular account must also be taken of the shape of the sclera, which differs from eye to eye. When the central cornea radii are equal, the sclera can flatten in different manners starting from the cornea. At one end of the scale of possibilities are very flat shapes, and at the other end very steep shapes of the sclera. In the first case, a fit which is in principle flatter is selected, that is to say, the central radius of curvature of the contact lens is selected to be greater (flatter) by 0.1 mm than the flattest central cornea radius. The rear bevel and the edge of the contact lens are in such a form that, in the case of a mobility of the lens of up to 2 mm, the edge of the lens does not "dig into" the surface of the eye.

In the second case, a steeper fit is selected in order to reduce the mobility of the lens to approximately 1 mm. It is endeavoured to ensure that the lens rests preferably on the edge of the cornea. The central radius of curvature of the contact lens is selected to be smaller by 0.1 mm than the flattest central cornea radius. In the case of the "steep fit", a lachrymal lens, which corresponds to a "positive" lens, is formed between the cornea and the rear face of the contact lens.

In the case of a normally shaped cornea surface, a parallel fit is preferred, in which the cornea and the rear face of the contact lens are separated by only a thin, uniform lachrymal film. If the cornea corresponds in shape largely to an ellipsoid of rotation—which can be inferred from the 3D measurement—the rear face of the contact lens is manufactured in the same shape. The eccentricity of the rear face is, of course, in that case chosen individually so that an optimum parallel fit is achieved.

The geometries of the remaining zones on the front face are determined taking into account factors similar to those considered in the determination of the geometry of the rear face, with the aim of achieving the best possible tolerability and freedom from irritation.

The geometry data obtained for the front face and the rear face of the contact lens are then so processed that they can be transferred to a contact lens production arrangement 14. The transfer is preferably effected using suitable data carriers, for example diskettes, discs, tapes and the like. It is, however, also possible to effect the transfer by means of long-distance data transmission between the fitter and the place of production. The storage and transfer are shown diagrammatically in FIG. 1 by a storage arrangement 7 for the geometry of the front and rear faces. This storage arrangement 7 influences a control arrangement 8 in the shaping arrangement 14 for the contact lens to be manufactured. That shaping arrangement 14 may comprise a tool holder 9 for a material-removing tool, especially a turning tool 12. The machine tool also comprises a headstock 10 having a rotatable spindle 13. A lens blank 11 can be secured in known manner to the headstock centre. The blank may be a lens button or a pre-shaped semi-finished lens button. Such turning machines are known (for example German Patent Specification 3 110 624). The control of the position of the turning tool 12 and the spindle 13 in the headstock 10 is effected. however, by means of the control arrangement 8, the control signals of which are predetermined by the geometry data for the front face of the lens and the rear face of the lens, which data are stored in the storage arrangement 7. These control signals from the control unit 8 influence the relative position of the turning tool 12 with respect to the lens blank 11, so that the appropriate amounts of material are removed from the lens blank 11 in accordance with the desired geometry data.

In the illustrated embodiment of the material-removing machine tool, the turning tool 12 can be arranged so that it is pivotable about a pivot axis Y extending perpendicularly to the spindle axis X, as is the case, for example, of the machine known from German Patent Specification 3 110 624. The pivot angle of the turning tool 12 about the axis Y and also the distance from the turning tool 12 to the pivot axis Y can be adjusted by the control unit 8. The adjustment is effected in accordance with the geometry data for the front face and the rear face of the contact lens to be manufactured, which data is contained in the storage arrangement 7. In the embodiment shown, the contact lens is manufactured in a direct lather process, that is to say, the desired geometries of the front face or of the rear face are manufactured on the lens blank 11 by means of the lathe machine shown.

Using the material-removing machine tool shown. it is, however, also possible to produce moulding faces 18, 19 on mould inserts 16, 17 (FIG. 2) in accordance with the stored geometry data for the front face and the rear face of the contact lens to be manufactured. For that purpose, the appropriate mould insert 16 or 17 is placed on and secured to the centre of the spindle 13 in the place of the lens blank 11. Under the control of the control unit 8, the moulding faces 18 and 19, by means of which the rear face of the contact lens and the front face of the contact lens are manufactured in a casting process shown diagrammatically in FIG. 2, are then produced. When the contact lens is cast, the contact lens material is introduced in known manner between the two shaping faces 18 and 19 of the mould inserts 16 and 17. A polymerisable contact lens material can be introduced as the starting material between the two mould inserts 16 and 17. The casting operation can then be carried out in known manner. In addition, it is also possible to use thermoforming processes in known manner.

The finished contact lens is handed over to the contact lens wearer and a fitting check is carried out. The fitting check can be carried out, for example, with fluo images. The fluo images are preferably evaluated using an image-processing system which may be integrated in the computer unit 3 or connected thereto. The fitting philosophy stored in the storage arrangement 2 can then, if necessary, be corrected in accordance with the statistical data resulting from the fitting check. That can be carried out in advantageous manner using artificial intelligence (AI) programs or neural networks.

What is claimed is:

1. A method for the manufacture of contact lenses, wherein the topography of the surface of the eye is measured three-dimensionally;

the geometry of the rear face of the lens is determined so as to fit the measured topography;

the optical effect of a lachrymal lens which is formed between the rear face of the lens and the surface of the eye is determined;

the geometry of the front face of the lens is determined taking into account the optical effect of the lachrymal lens and the sight correction to be achieved by the contact lens;

the data for the lens geometry of the front and the rear faces of the lens are stored; and the particular contact lens concerned is produced in accordance with the stored lens geometry data.

2. A method according to claim 1, wherein lens production is effected by removing material from a lens blank, and the material-removing tool is controlled by the stored geometry data.

3. A method according to claim 2, wherein a cutting tool is used as the material-removing tool.

4. A method according to claim 2, wherein a laser beam is used as the material-removing tool.

5. A method according to claim 1, wherein the contact lens is manufactured by casting and the geometry of the moulding faces of the mould is shaped in accordance with the stored geometry data of the lens.

6. A method according to claim 5, wherein the shaping tools for the manufacture of the moulding faces of the mould or the stamping die are shaped in accordance with the stored geometry data of the lens.

7. A method according to claim 1, wherein the contact lens is manufactured in accordance with the thermoforming process using a stamping die, the moulding stamp faces of which have been formed in accordance with the stored geometry data of the contact lens.

8. A method according to claim 7, wherein the shaping tools for the manufacture of the moulding faces of the mould or the stamping die are shaped in accordance with the stored geometry data of the lens.

9. A method according to claim 1, wherein the geometry of the rear face of the lens is determined additionally in accordance with statistical data obtained during fitting checks.

10. The method according to claim 1, wherein the geometry of the rear face of the contact lens, the optical effect of the lachrymal lens and the geometry of the front face of the contact lens are determined by computer.

* * * * *